United States Patent
McFerrin

(10) Patent No.: US 9,894,396 B1
(45) Date of Patent: Feb. 13, 2018

(54) MEDIA PRODUCTION SYSTEM WITH DYNAMIC MODIFICATION OF MULTIPLE MEDIA ITEMS

(71) Applicant: Tribune Broadcasting Company, LLC, Chicago, IL (US)

(72) Inventor: David McFerrin, Huntsville, AL (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

(21) Appl. No.: 15/450,202

(22) Filed: Mar. 6, 2017

(51) Int. Cl.
*H04N 7/173* (2011.01)
*H04N 21/262* (2011.01)
*H04N 21/84* (2011.01)
*H04N 21/61* (2011.01)

(52) U.S. Cl.
CPC ... *H04N 21/26258* (2013.01); *H04N 21/6125* (2013.01); *H04N 21/84* (2013.01)

(58) Field of Classification Search
CPC ......... H04N 21/26258; H04N 21/6125; H04N 21/84
See application file for complete search history.

(56) References Cited

U.S. PATENT DOCUMENTS

| | | | | |
|---|---|---|---|---|
| 5,532,832 A * | 7/1996 | Hailey | ................... | H04N 5/782 348/732 |
| 5,546,193 A * | 8/1996 | Hailey | .................... | H04N 7/10 348/725 |
| 8,428,201 B1 * | 4/2013 | McHann, Jr. | ........ | H03G 3/3089 375/257 |
| 2009/0254382 A1* | 10/2009 | Weeks | ................... | G06Q 10/02 705/5 |
| 2016/0330803 A1* | 11/2016 | Guatta | ................... | H05B 6/686 |

* cited by examiner

*Primary Examiner* — Oleg Asanbayev
(74) *Attorney, Agent, or Firm* — McDonnell Boehnen Hulbert & Berghoff LLP

(57) ABSTRACT

In one aspect, an example method includes (i) accessing a first set of ordered content items and a second set of active/inactive status attributes; (ii) identifying a subset of the first set based on each content item of the subset corresponding to an active status attribute in the second set; (iii) using the content items of the identified subset to generate a plurality of media items, each generated media item including the content items of the identified subset and being a respective type of media item; (iv) determining that a particular content item of the first set satisfies a condition, wherein the particular content item corresponds to a particular active/inactive status attribute of the second set; (v) based on the determination, modifying the particular active/inactive status attribute; and (vi) after modifying the particular active/inactive status attribute, repeating the identifying and using acts, thereby causing modification of the generated media items.

20 Claims, 9 Drawing Sheets

| Story Title | Video Content Item Identifier | Duration | DVE Identifier |
|---|---|---|---|
| STORY A | VCI ID A | 00:02:00:00 | DVE ID A |
| STORY B | VCI ID B | 00:01:30:00 | |
| STORY C | | 00:00:30:00 | |
| STORY D | VCI ID D | 00:00:30:00 | |
| STORY E | VCI ID E | 00:00:30:00 | |
| COMMERCIAL BREAK | | | |
| STORY F | VCI ID F | 00:02:00:00 | DVE ID F |
| STORY G | | 00:01:30:00 | |
| STORY H | VCI ID H | 00:00:30:00 | |
| STORY I | VCI ID I | 00:00:30:00 | |

Figure 5

| Content Items | Active/Inactive Status Attribute |
|---|---|
| CONTENT ITEM A | ACTIVE |
| CONTENT ITEM B | ACTIVE |
| CONTENT ITEM C | ACTIVE |
| CONTENT ITEM D | INACTIVE |
| CONTENT ITEM E | ACTIVE |
| CONTENT ITEM F | INACTIVE |
| CONTENT ITEM G | ACTIVE |
| CONTENT ITEM H | ACTIVE |
| CONTENT ITEM I | INACTIVE |
| CONTENT ITEM J | INACTIVE |

Figure 6

MEDIA PRODUCTION SYSTEM WITH DYNAMIC MODIFICATION OF MULTIPLE MEDIA ITEMS

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is disclosed. The method includes (i) accessing, by a computing system, a first set of content items and a second set of active/inactive status attributes, wherein each content item of the first set corresponds to a respective active/inactive status attribute of the second set; (ii) identifying, by the computing system, a subset of the first set based on each content item of the subset corresponding to an active status attribute in the second set; (iii) using, by the computing system, the content items of the identified subset to generate a plurality of media items, wherein each generated media item of the plurality of media items both (a) includes the content items of the identified subset and (b) is a respective one of a plurality of types of media items; (iv) making, by the computing system, a determination that either a particular content item of the first set or data associated with the particular content item satisfies each condition in a condition set, wherein the particular content item corresponds to a particular active/inactive status attribute of the second set; (v) based, at least in part, on the determination, modifying the particular active/inactive status attribute; and (vi) after modifying the particular active/inactive status attribute, repeating, by the computing system, the identifying and using steps, thereby causing modification of the generated plurality of media items.

In another aspect, an example non-transitory computer-readable medium is disclosed. The computer-readable medium has stored thereon program instructions that upon execution by a processor, cause performance of a set of acts including (i) accessing, by a computing system, a first set of content items and a second set of active/inactive status attributes, wherein each content item of the first set corresponds to a respective active/inactive status attribute of the second set; (ii) identifying, by the computing system, a subset of the first set based on each content item of the subset corresponding to an active status attribute in the second set; (iii) using, by the computing system, the content items of the identified subset to generate a plurality of media items, wherein each generated media item of the plurality of media items both (a) includes the content items of the identified subset and (b) is a respective one of a plurality of types of media items; (iv) making, by the computing system, a determination that either a particular content item of the first set or data associated with the particular content item satisfies each condition in a condition set, wherein the particular content item corresponds to a particular active/inactive status attribute of the second set; (v) based, at least in part, on the determination, modifying the particular active/inactive status attribute; and (vi) after modifying the particular active/inactive status attribute, repeating, by the computing system, the identifying and using steps, thereby causing modification of the generated plurality of media items.

In another aspect, an example computing system is disclosed. The computing system is configured for performing a set of acts including (i) accessing, by the computing system, a first set of content items and a second set of active/inactive status attributes, wherein each content item of the first set corresponds to a respective active/inactive status attribute of the second set; (ii) identifying, by the computing system, a subset of the first set based on each content item of the subset corresponding to an active status attribute in the second set; (iii) using, by the computing system, the content items of the identified subset to generate a plurality of media items, wherein each generated media item of the plurality of media items both (a) includes the content items of the identified subset and (b) is a respective one of a plurality of types of media items; (iv) making, by the computing system, a determination that either a particular content item of the first set or data associated with the particular content item satisfies each condition in a condition set, wherein the particular content item corresponds to a particular active/inactive status attribute of the second set; (v) based, at least in part, on the determination, modifying the particular active/inactive status attribute; and (vi) after modifying the particular active/inactive status attribute, repeating, by the computing system, the identifying and using steps, thereby causing modification of the generated plurality of media items.

BRIEF DESCRIPTION OF THE DRAWINGS

FIG. 5 is a simplified block diagram of an example program schedule.

FIG. 6 is a simplified block diagram of example content data.

DETAILED DESCRIPTION

I. Overview

Figure 1:
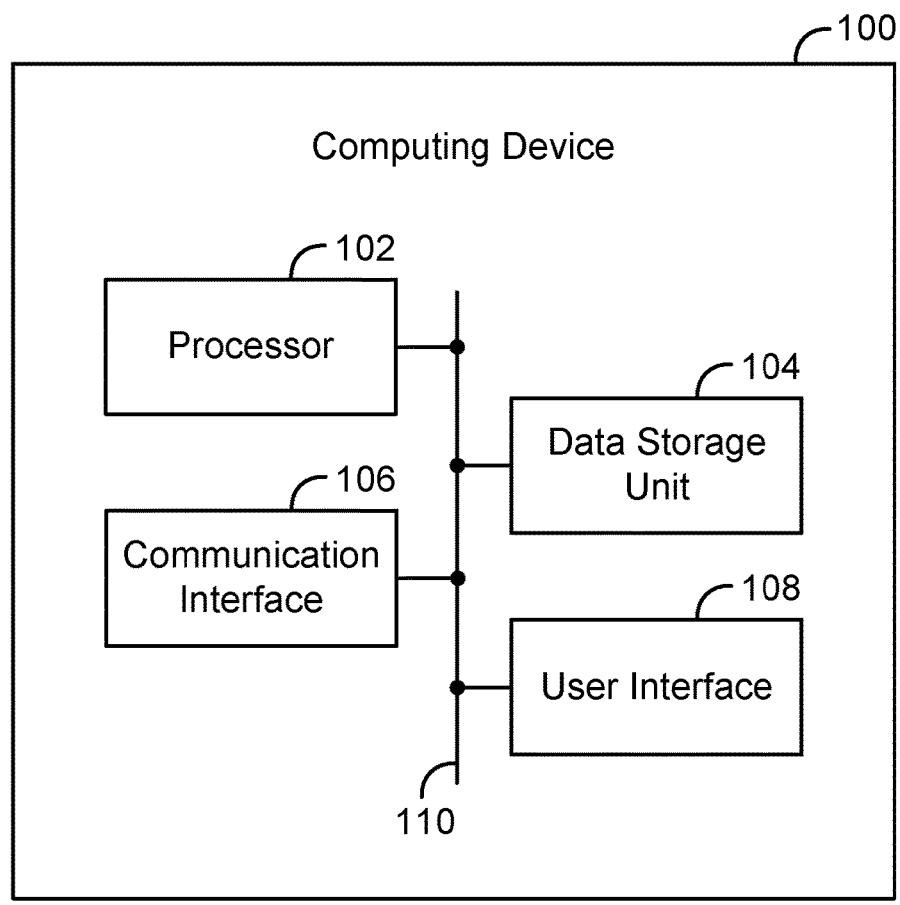
FIG. 1 is a simplified block diagram of an example computing device.

A media system can use various data to generate various types of media content. For instance, the media system can include a video-production system (VPS) that can use data to generate video content that can serve as or be part of a video program (e.g., a news program). The VPS can then transmit the video content to a video-broadcast system (VBS), which in turn can transmit the video content to an end-user device for presentation of the video content to an end-user. The media system can further include a web server that can use the data to generate web content. The web server can then provide the generated web content to the end-user device for presentation of the web content to the end-user.

The VPS can include various components to facilitate generating video content. For example, the VPS can include a video source, a digital video-effect (DVE) system, a scheduling system, and a sequencing system. The video source can generate video content, and can transmit the video content to the DVE system. The DVE system can use the video content and a DVE template to execute a DVE, which can cause the DVE system to generate new video content that is a modified version of the received video content. For example, the generated video content can include the received video content with local weather content overlaid thereon.

The scheduling system can create a program schedule, perhaps based on input received from a user (e.g., a producer or technical director) via a user interface. The sequencing system can process records in the program schedule, and based on the processed records, can control one or more components of the VPS, such as the video source and the DVE system, to facilitate generating video content.

In one example, the VPS can also include an election system and a character generator. The election system can obtain election data, and the character generator can then use the election data to generate video content that includes the election data (e.g., the generated video content can include a graphical depiction of the information represented by the election data, such as characters and/or graphics that depict election tallies, ongoing races, results, projected outcomes, etc.). Further, the character generator can transmit the video content to the DVE system. The DVE system can receive the video content and can execute a DVE, which causes the DVE system to generate video content that includes the received video content and thus, that also includes the election data. The generated video content can serve as or be part of a video program. Thus, in this way, the VPS can integrate election data into a video program.

The video content generated by the character generator can take various forms. In some examples, the generated video content can present a number of content items in a sequential order. For instance, the election data can include a number of content items arranged sequentially in a certain file format (e.g., an XML file), and the character generator can generate the video content presenting the content items in their sequential order.

The election system can also provide the election data to a web server, and the web server can then use the election data to generate various web content that includes the election data. For instance, the web server can generate web pages that include graphical depictions of the information represented by the election data. The end-user device can then access the generated web pages via a web browser.

In some instances, it can be desirable to dynamically modify the media content generated by the VPS and the web server. In particular, it can be desirable to modify the generated video content during production of the video program while concurrently modifying the generated web content. For example, during an election, if a race becomes significantly lopsided such that viewer interest declines, it may be desirable to modify the generated media content such that election data (e.g., vote counts, candidate names, etc.) associated with that particular race is removed from both the video program and the web page. Moreover, if election data that is currently excluded from the video program and the web page is associated with a race that becomes significantly close such that viewer interest increases, it may be desirable to modify the generated video content and web content to include the election data.

One way to modify the generated video content is to modify the election data accessed by the character generator. For example, one or more content items may be added to or removed from the data that is accessed by the character generator. However, in some systems, adding or removing a content item to or from the data accessed by the character generator can cause the character generator to restart generation of the video content from the beginning of the sequence of content items. This can be problematic if such a modification is made during production of the video program, as it may result in content items sequentially arranged near the end of the election data being skipped and effectively excluded from the generated video content.

Similarly, one way to modify the generated web content is to modify the election data that is provided to the web server, such as by adding or removing one or more content items to or from the provided election data. However, manipulating the election data for each computing system configured to receive the data (e.g., the character generator and the web server) can become cumbersome, particularly when the election data is being provided to a large quantity of systems. Such a process could result in significant delay between changes made to different media items so that a first media item (e.g., video content including the election data) could include data that is inconsistent with a second media item (e.g., web content including the election data).

The present disclosure provides a media system that helps address these issues. In one aspect, the same election data can be provided to a plurality of media-generating computing systems, such as the character generator and the web server, and the election data can further include a set of active/inactive status attributes each corresponding to a respective content item. The character generator can include or exclude each content item from any generated video content based on the content item's corresponding active/inactive status attribute. Similarly, the web server can include or exclude each content item from any generated web content based on the content item's corresponding active/inactive status attribute.

The election system can use various data associated with the election to determine whether to modify a particular active/inactive status attribute. Based at least in part on the determination, while video content and web content is being generated, the election system can modify the particular active/inactive status attribute, thereby modifying the generated video content and web content. As a result, one or more content items can be concurrently added or removed from the generated video content and web content without adding or removing content items from the election data and without having separate election data accessed by the character generator and the web server.

The present disclosure provides a variety of advantageous outcomes. For instance, using the same election data to generate multiple different types of media items can allow the different media items to be concurrently modified, thereby reducing or eliminating inconsistencies between the different media items. Further, in instances where the character generator and/or associated DVE systems generate video content that includes a repeating sequence of the election data, a given content item can be added and/or removed from the sequence without restarting the generation of video content from the beginning of the sequence of content items, because the content item can be included or excluded by merely altering the content item's corresponding status attribute rather than adding or removing the content item to or from the election data.

II. Example Architecture

A. Computing Device

FIG. 1 is a simplified block diagram of an example computing device 100. The computing device can be configured to perform and/or can perform one or more acts and/or functions, such as those described in this disclosure. The computing device 100 can include various components, such as a processor 102, a data storage unit 104, a communication interface 106, and/or a user interface 108. Each of these components can be connected to each other via a connection mechanism 110.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

The processor 102 can include a general-purpose processor (e.g., a microprocessor) and/or a special-purpose processor (e.g., a digital signal processor (DSP)). The processor 102 can execute program instructions contained in the data storage unit 104 as discussed below.

The data storage unit 104 can include one or more volatile, non-volatile, removable, and/or non-removable storage components, such as magnetic, optical, and/or flash storage, and/or can be integrated in whole or in part with the processor 102. Further, the data storage unit 104 can take the form of a non-transitory computer-readable storage medium, having stored thereon program instructions (e.g., compiled or non-compiled program logic and/or machine code) that, upon execution by the processor 102, cause the computing device 100 to perform one or more acts and/or functions, such as those described in this disclosure. These program instructions can define and/or be part of a discrete software application. In some instances, the computing device 100 can execute program instructions in response to receiving an input, such as from the communication interface 106 and/or the user interface 108. The data storage unit 104 can also store other types of data, such as those types described in this disclosure.

The communication interface 106 can allow the computing device 100 to connect with and/or communicate with another other entity according to one or more protocols. In one example, the communication interface 106 can be a wired interface, such as an Ethernet interface or a high-definition serial-digital-interface (HD-SDI). In another example, the communication interface 106 can be a wireless interface, such as a cellular or WI-FI interface. In this disclosure, a connection can be a direct connection or an indirect connection, the latter being a connection that passes through and/or traverses one or more entities, such as a router, switcher, or other network device. Likewise, in this disclosure, a transmission can be a direct transmission or an indirect transmission.

The user interface 108 can include hardware and/or software components that facilitate interaction between the computing device 100 and a user of the computing device 100, if applicable. As such, the user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

The computing device 100 can take various forms, such as a workstation terminal, a desktop computer, a laptop, a tablet, a mobile phone, a set-top box, and/or a television.

B. Media System

Figure 2:
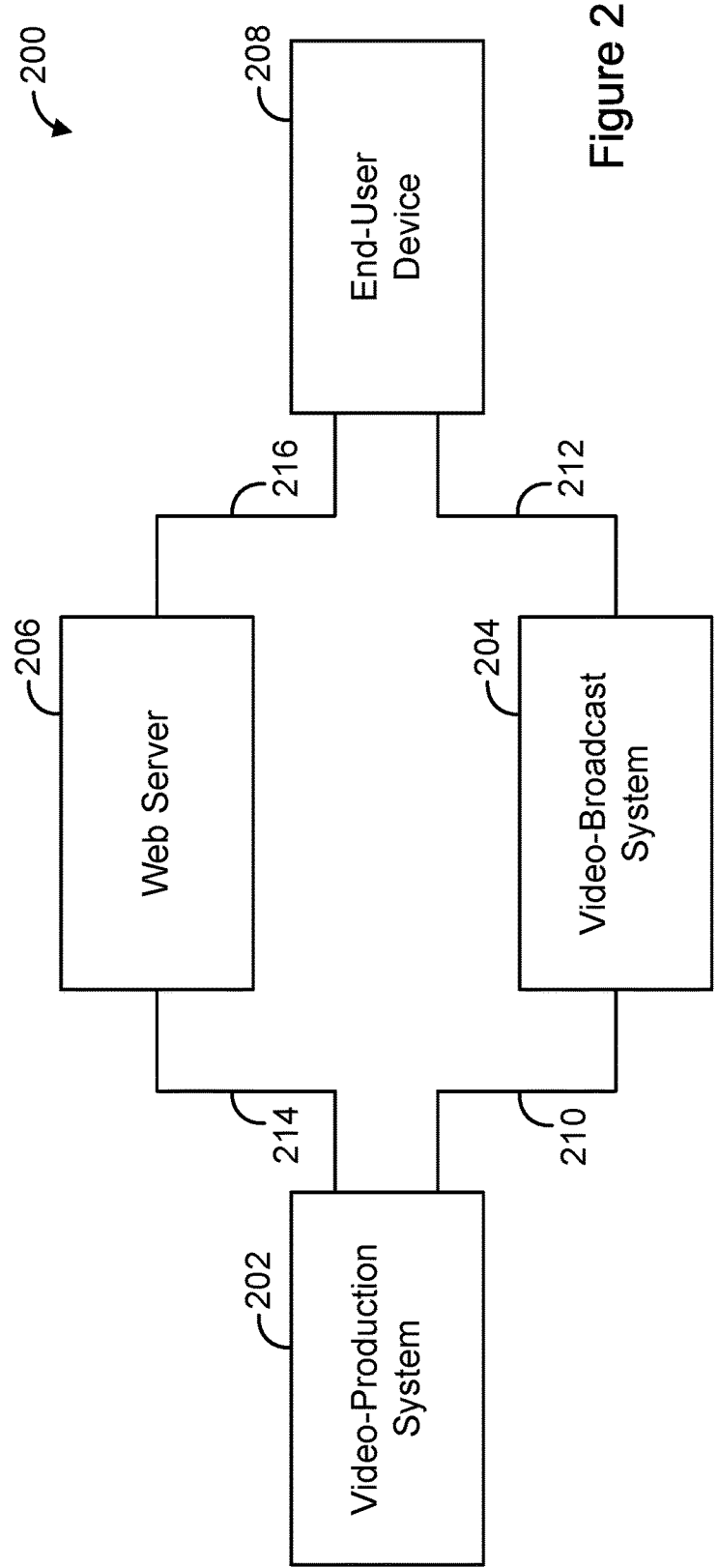
FIG. 2 is a simplified block diagram of an example media system.

FIG. 2 is a simplified block diagram of an example media system 200. The media system 200 can perform various acts and/or functions related to media content, and can be implemented as a computing system. In this disclosure, the term "computing system" means a system that includes at least one computing device. In some instances, a computing system can include one or more other computing systems.

The media system 200 can include various components, such as a VPS 202, a VBS 204, a web server 206, and an end-user device 208, each of which can be implemented as a computing system. The media system 200 can also include a connection mechanism 210, which connects the VPS 202 with the VBS 204; a connection mechanism 212, which connects the VBS 204 with the end-user device 208; a connection mechanism 214, which connects the VPS 202 with the web server 206; and a connection mechanism 216, which connects the web server 206 with the end-user device 208.

Figure 3:
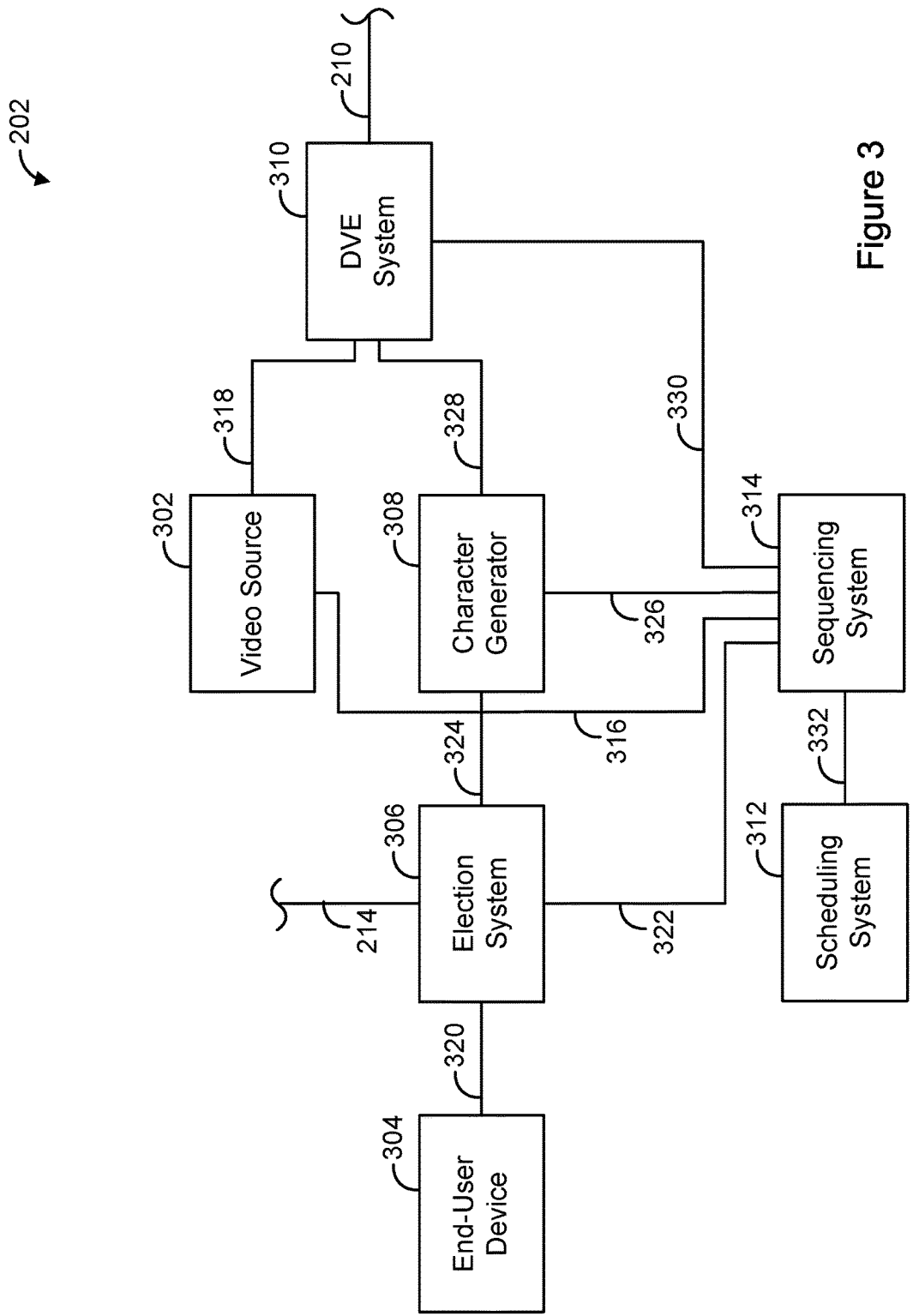
FIG. 3 is a simplified block diagram of an example video production system.

FIG. 3 is a simplified block diagram of an example VPS 202. The VPS 202 can include various components, such as a video source 302, an end-user device 304, an election system 306, a character generator 308, a digital video-effect (DVE) system 310, a scheduling system 312, and a sequencing system 314, each of which can be implemented as a computing system. The VPS 202 can also include a connection mechanism 316, which connects the video source 302 with the sequencing system 314; a connection mechanism 318, which connects the video source 302 with the DVE system 310; a connection mechanism 320, which connects the end-user device 304 with the election system 306; a connection mechanism 322, which connects the election system 306 with the sequencing system 314; a connection mechanism 324, which connects the election system 306 with the character generator 308; a connection mechanism 326, which connects the character generator 308 with the sequencing system 314; a connection mechanism 328, which connects the character generator 308 with the DVE system 310; a connection mechanism 330, which connects the DVE system 310 with the sequencing system 314; and a connection mechanism 332, which connects the scheduling system 312 with the sequencing system 314.

The video source 302 can take various forms, such as a video server, a video camera, a satellite receiver, a character generator, or a DVE system. An example video server is the K2 server provided by Grass Valley of San Francisco, Calif.

The character generator 308 can take various forms. An example character generator is the VIZ TRIO provided by Viz Rt of Bergen, Norway. Another example character generator is CASPAR CG developed and distributed by the Swedish Broadcasting Corporation (SVT).

The DVE system 310 can take various forms, such as a production switcher. An example production switcher is the VISION OCTANE production switcher provided by Ross Video Ltd. of Iroquois, Ontario in Canada.

The scheduling system 312 can take various forms. An example scheduling system is WO TRAFFIC provided by WideOrbit, Inc. of San Francisco, Calif. Another example scheduling system is OSI-TRAFFIC provided by Harris Corporation of Melbourne, Fla.

The sequencing system 314 can take various forms. A sequencing system is sometimes referred to in the industry as a "production automation system."

Referring back to FIG. 2, the VBS 204 can include various components, such as a terrestrial antenna or a satellite transmitter, each of which can be implemented as a computing system. Additionally, the web server 206 can include one or more computing systems for generating, storing, processing, and delivering web pages to end-user devices, such as the end-user device 208.

Each of the video-based entities described in this disclosure can include or be integrated with a corresponding audio-based entity. Also, the video content described in this disclosure can include or be integrated with corresponding audio content.

III. Example Operations

The media system 200 and/or components thereof can perform various acts and/or functions. These features and related features will now be described.

The media system 200 can perform various acts and/or functions related to media content. For example, the media system 200 can receive, generate, output, and/or transmit media content that can serve as or be part of a video program (e.g., a news program). In this disclosure, the act of receiving, generating, outputting, and/or transmitting media content can occur in various ways and/or according to various standards. For example, the act of receiving, outputting, and/or transmitting media content can include receiving, outputting, and/or transmitting a video stream representing video content, such as over Internet Protocol (IP) or in accordance with the high-definition serial digital interface (HD-SDI) standard. Likewise, the act of generating content can include generating a video stream representing the video content. Also, the act of receiving, generating, outputting, and/or transmitting video content can include receiving, generating, outputting, and/or transmitting an encoded or decoded version of the video content.

The VPS 202 can perform various acts and/or functions related to video content production. For example, the VPS 202 can generate and/or output video content, and can transmit the video content to another entity, such as the VBS 204.

Referring back to FIG. 3, within the VPS 202, the video source 302 can generate and/or output video content, and can transmit the video content to another entity, such as the DVE system 310. In practice, the VPS 202 is likely to include multiple video sources and corresponding connection mechanisms, each connecting a respective one of the video sources with the DVE system 310.

As noted above, the video source 302 can take the form of a video server. A video server can record and/or store video content (e.g., in the form of a file). Further, the video server can retrieve stored video content and can use the retrieved video content to generate and/or output a video stream representing the video content. This is sometimes referred to in the industry as the video server playing out the video content. The video server can then transmit the video stream, thereby transmitting the video content, to another entity, such as the DVE system 310.

The end-user device 304 and the election system 306 can perform various acts and/or functions related to obtaining, processing, and/or outputting election data. In this disclosure, the term "election" means any type of vote-based decision-making process. In one example, an election can involve a process where voters vote to determine which candidate obtains a political office. In another example, an election may involve a ballot-initiative process where voters vote to determine whether or not a proposed law becomes law.

Election data can be provided by various sources, such as from a government-operated reporting system, and can take various forms. Election data can indicate various types of information about an election, such as a title of a political office that is the subject of the election, a name and other information of a candidate, an amount of votes cast and/or tabulated for a candidate, an amount and an identification of precincts or other zones reporting tabulated votes, and/or a projection outcome.

The election system 306 can receive election data and can do so in various ways. For example, the election system can receive election data by obtaining it from another entity, such as the end-user device 304.

The election system 306 can also store, select, and/or retrieve election data, perhaps based on input received from a user (e.g., a producer or technical director) via a user interface. As such, the election system 306 can store obtained election data in a data storage unit (e.g., a data storage unit of the election system 306), and can then receive the election data by selecting and retrieving it from the data storage unit. The election system 306 can also modify election data and can do so in various ways.

The election system 306 can also transmit election data to various other entities, such as the web server 206.

The web server 206 can also receive the election data or other content in various ways. For example, the web server 206 can receive content by receiving it from another entity, such as the election system 306. In another example, the web server 206 can receive content by selecting and retrieving it from a data storage unit (e.g., a data storage unit of the election system 306).

The web server 206 can use various scripting techniques (e.g., using PHP or other scripting languages) to generate web pages (e.g., as Hypertext Markup Language (HTML) files and/or various other forms) that include the received content. For instance, a generated web page can include a graphical depiction of the information represented by the received content, such as characters and/or graphics that depict election tallies, ongoing races, results, projected outcomes, etc. Alternatively or additionally, rather than the web server 206 generating web pages, one or more other entities of the media system 200 can generate web pages and can then transmit the generated web pages to the web server 206. For instance, the election system 306 can generate a web page including a graphical depiction of election data and can transmit the web page to the web server 206.

Further, the web server 206 can provide the web pages to various entities, such as the end-user device 208. For instance, the web server 206 can store the web pages in a database, and the end-user device 208 can request a particular web page from the web server 206 according to various communication protocols, such as using the Hypertext Transfer Protocol (HTTP). The web server 206 can responsively retrieve the requested web page from the database and transmit the retrieved web page to the end-user device 208, and the end-user device 208 can present the web page to an end user via a user interface.

In addition to transmitting election data to the web server 206, the election system 306 can transmit election data to various other entities, such as the character generator 308.

The character generator 308 can use a character generator template and content to generate and/or output video content that includes the election data. The character generator template specifies the manner in which the character generator 308 uses the election data to generate and/or output the video content. The character generator 308 can create and/or modify a character generator template, perhaps based on input received from a user via a user interface. Further, the character generator 308 can store, select, and/or retrieve a character generator template, perhaps based on input received from a user via a user interface. As such, the character generator 308 can store a character generator template in a data storage unit (e.g., a data storage unit of the character generator 308), and can then receive the character generator template by retrieving it from the data storage unit.

The character generator 308 can also receive content in various ways. For example, the character generator 308 can receive content by receiving it from another entity, such as the election system 306. In another example, the character generator 308 can receive content by selecting and retrieving it from a data storage unit (e.g., a data storage unit of the election system 306).

The character generator template can specify how the character generator 308 is to receive content. In one example, the character generator template can do so by specifying that the character generator 308 is to receive content on a particular input of the character generator 308 (e.g., an input that maps to a particular entity, such as the election system 306). In another example, the character generator template can do so by specifying that the character generator 308 is to receive content by retrieving it from a particular location of a particular data storage unit (e.g., a data storage unit of the character generator 308).

In one example, the character generator 308 can use an ordered set of content items to generate video content that includes the content items in the specified order. This type of generated video content is sometimes referred to in the industry as a "ticker." The content items can include various types of content, such as text and/or images. In one example, each of these content items can be election data. The ordered set of content items can be stored in various forms, such as in the form of an Extensible Markup Language (XML) file.

After the character generator 308 generates and/or outputs video content, the character generator 308 can transmit the video content to another entity, such as the DVE system 310, and/or can store the video content in a data storage unit (e.g., a data storage unit of the character generator 308).

As such, in one example, the character generator 308 can receive election data, can use the election data to generate and/or output video content that includes the election data, and can transmit the video content to the DVE system 310.

The DVE system 310 can use a DVE template to generate and/or output video content. This is sometimes referred to in the industry as the DVE system "executing a DVE." In some instances, the DVE system 310 can execute multiple DVEs in serial or overlapping fashion.

The DVE template specifies the manner in which the DVE system 310 generates and/or outputs video content. The DVE system 310 can create and/or modify a DVE template, perhaps based on input received from a user via a user interface. Further, the DVE system 310 can store and/or retrieve a DVE template, perhaps based on input received from a user via a user interface. As such, the DVE system 310 can store a DVE system template in a data storage unit (e.g., a data storage unit of the DVE system 310), and can then receive the DVE template by selecting and retrieving it from the data storage unit.

In some instances, the DVE system 310 can use the DVE template and content to generate and/or output video content that includes the content. The DVE system 310 can receive content in various ways. For example, the DVE system 310 can receive content from another entity, such as the video source 302 and/or the character generator 308. In another example, the DVE system 310 can select and retrieve content from a data storage unit (e.g., a data storage unit of the DVE system 310).

The DVE template can specify how the DVE system 310 is to receive content. In one example, the DVE template can specify that the DVE system 310 is to receive content on a particular input of the DVE system 310 (e.g., an input that maps to a particular entity, such as the video source 302 or the character generator 308). In another example, the DVE template can specify that the DVE system 310 is to receive content by retrieving it from a particular location of a particular data storage unit (e.g., a data storage unit of the DVE system 310).

A DVE template can be configured in various ways, which can allow the DVE system 310 to execute various types of DVEs. In one example, a DVE template can specify that the DVE system 310 is to receive video content from the video source 302 and other content (e.g., local weather content) from a data storage unit of the DVE system, and is to overlay the other content on the video content, thereby generating a modified version of the video content. As such, in one example, the DVE system 310 can generate video content by modifying video content.

Figure 4A:
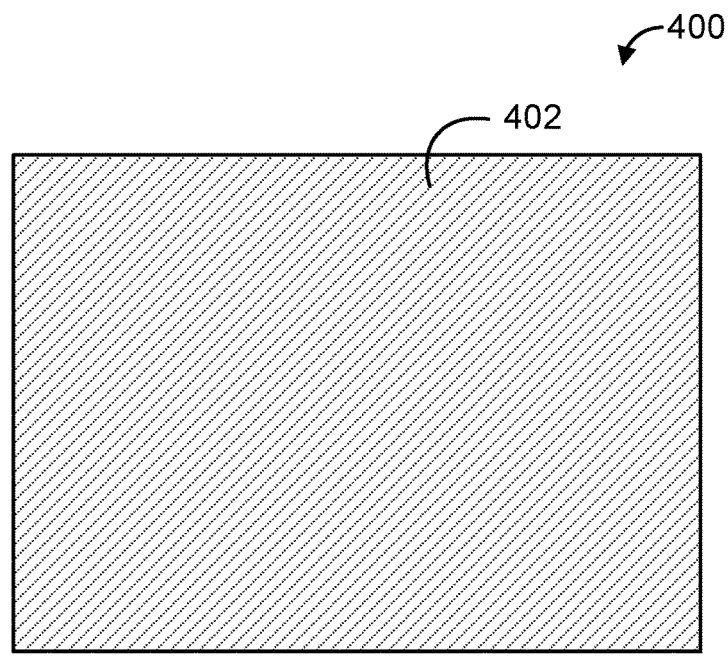
FIG. 4A is a simplified diagram of an example frame of video content, without content overlaid thereon.
Figure 4B:
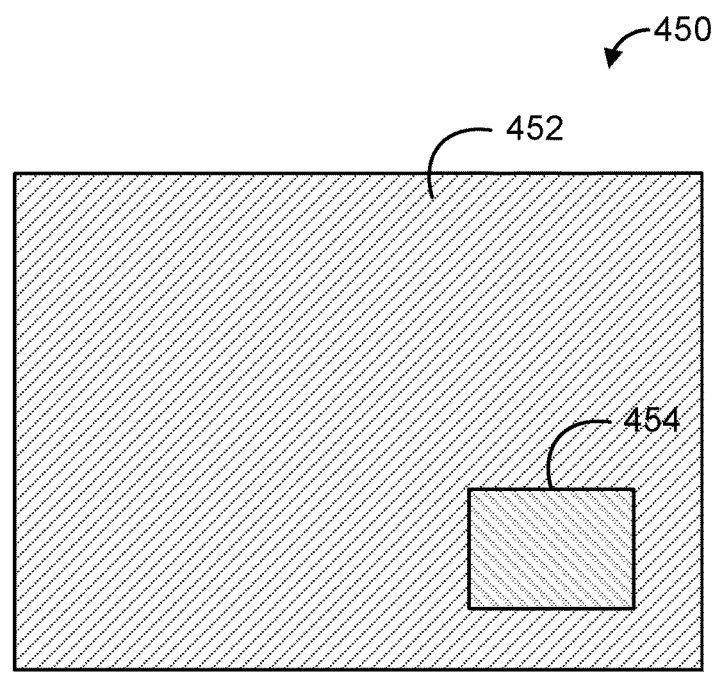
FIG. 4B is a simplified diagram of an example frame of video content, with content overlaid thereon.

FIGS. 4A and 4B help illustrate this concept of overlaying other content on video content. FIG. 4A is a simplified depiction of an example frame 400 of video content. Frame 400 includes content 402, but does not include other content overlaid on content 402. For comparison, FIG. 4B is a simplified depiction of another example frame 450 of video content. Frame 450 includes content 452 and other content 454 overlaid on content 452.

In another example, a DVE template can specify that the DVE system 310 is to receive first video content from the video source 302 and second video content from the character generator 308, and is to overlay the second video content on the first video content, thereby generating a modified version of the first video content.

In another example, a DVE template can specify that the DVE system 310 is to receive first video content from the video source 302 and second video content from the character generator 308, and is to scale-down and re-position the first video content and the second video content, each in a respective one of two windows positioned side-by-side. As such, the DVE system 310 can generate video content by scaling and/or re-positioning video content.

After the DVE system 310 generates and/or outputs the video content, the DVE system 310 can transmit the video content to another entity, such as the VBS 204, or can store the video content in a data storage unit (e.g., a data storage unit of the DVE system 310).

As such, in one example, the DVE system 310 can receive first video content including election data, and can use the first video content to generate and/or output second video content that includes the election data. This is an example way in which the VPS 202 can integrate election data into a video program.

The VPS 202 can also integrate election data into a video program in other ways. For example, in the case where the video source 302 is a video camera, the election system 306 can include a display device that is located within a field of the view of the video camera while the video camera records video content that serves as or is made part of the video program. In one example, the display device can be touch-enabled, which can allow a user (e.g., a news anchor) to interact with the election data. To facilitate the user's interaction with the election data, the display device and/or other components of the election system 306 can be programmed with instructions that cause particular actions to be performed in response to particular touch commands.

The scheduling system 312 can perform various acts and/or functions related to the scheduling of video content production. For example, the scheduling system 312 can create and/or modify a program schedule of a video program, perhaps based on input received from a user via a user interface. Further, the scheduling system 312 can store and/or retrieve a program schedule, perhaps based on input received from a user via a user interface. As such, the scheduling system 312 can store a program schedule in a data storage unit (e.g., a data storage unit of the scheduling system 312), and can then receive the program schedule by selecting and retrieving it from the data storage unit. The scheduling system 312 can also transmit a program schedule to another entity, such as the sequencing system 314.

The sequencing system 314 can process records in the program schedule. This can cause the sequencing system 314 to control one or more other components of the VPS 202 to facilitate the VPS 202 generating and/or outputting video content, which can serve as or be part of a video program. For example, the sequencing system 314 can control the video source 302, the election system 306, the character generator 308, and/or the DVE system 310 to perform the various acts and/or functions described in this disclosure.

The sequencing system 314 can receive a program schedule in various ways. For example, the sequencing system 314 can do so by receiving it from another entity, such as the scheduling system 312. In another example, the sequencing system 314 can do so by selecting and retrieving it from a data storage unit (e.g., a data storage unit of the scheduling system 312).

A program schedule (sometimes referred to in the industry as a "rundown") serves as a schedule or outline of a video program and can include multiple records. A video program can be conceptually divided into multiple logically-separated portions (sometimes referred to in the industry as "stories"). As such, each portion of the video program can be represented by a separate record of the program schedule. In some cases, each record can also include one or more sub-records. Each record (including a sub-record) can include various types of data.

FIG. 5 is a simplified diagram of an example program schedule 500. The program schedule 500 includes ten records represented as ten ordered rows. Each record corresponds to a respective portion of a video program, except for one which corresponds to a commercial break. For each portion, the respective record specifies at least one data item that corresponds to that portion of the video program. In particular, each record specifies at least one of a story title, a video content item identifier, a duration, and a DVE identifier (which can serve as an instruction to execute the identified DVE).

A video content item can consist of logically-related video content. For example, a video content item can be a commercial. As another example, a video content item can be a portion of a television program that is scheduled between two commercial breaks. This is sometimes referred to in the industry as a "program segment."

As shown in FIG. 5, the first record specifies a story title of STORY A, a video content identifier of VCI ID A, a duration of 00:02:00:00 (in hours::minutes::seconds::frames format), and a DVE identifier of DVE ID A. As such, upon the sequencing system 314 processing the first record, the sequencing system 314 can cause the video source 302 to playout a video content item identified by the identifier VCI ID A for two minutes, and can further cause the DVE system 310 to execute a DVE identified by the identifier DVE ID A, which for example, can cause the DVE system 310 to overlay content on the identified video-content item.

The program schedule 500 has been greatly simplified for the purposes of illustrating certain features. In practice, a program schedule is likely to include significantly more data.

In some instances, the sequencing system 314 can process a next record in the program schedule based on a trigger event. In one example, the trigger event can be the sequencing system 314 completing one or more actions related to a current record in the program schedule. In another example, the trigger event can be the sequencing system 314 receiving input from a user via a user interface.

Referring back to FIG. 2, the VBS 204 can receive video content from the VPS 202, which in turn can transmit the video content to the end-user device 208 for presentation of the video content to an end user. In practice, the VBS 204 can transmit video content to a large number of end-user devices for presentation of the video content to a large number of end users. The VBS 204 can transmit video content to the end-user device 208 in various ways. For example, VBS 204 can transmit video content to the end-user device 208 over-the-air or via a packet-based network such as the Internet. The end-user device 208 can receive video content from the VBS 204, and can present the video content to an end user via a user interface.

FIG. 6 is a simplified diagram of example content data 600 that can be provided to a DVE system or a character generator. For example, election system 306, or some other system of the VPS 202, can provide the content data 600 to various media-generation systems, and the media-generation systems can then generate various media content based on the content data 600. For instance, the election system 306 can provide the content data 600 to the character generator 308 and to the web server 206. The character generator 308 can then generate video content based on the content data 600, and the web server 206 can generate web content based on the content data 600. The content data 600 can take various forms, such as the form of an XML file.

As shown, the example content data 600 includes ten ordered content items, each corresponding to respective data that may or may not be included in media content generated by the character generator 308 or the web server 206. For example, the character generator 308 and the web server 206 can generate media content that includes some or all of the content items. In some instances, the generated media content can include the content items in the sequential order in which they are arranged in the content data 600. For instance, the character generator 308 can generate various forms of video content, such as a scrolling ticker, a list, a table, or some other video content that presents the content items in their sequential order.

The character generator 308 and the web server 206 can be configured to generate media content that includes all of the content items of the content data 600. In one example, the web server 206 can generate a web page that displays content items A through J in a table or some other graphical form while the character generator 308 can generate a ticker that first presents content item A, followed by content item B, and so on. With such an arrangement, once the generated ticker presents content item J, the ticker can repeat the sequence starting with content item A again. In order to remove a particular content item from the generated video content and web content, that particular content item can be removed from the content data 600 (e.g., by removing a row from the XML file). Similarly, in order to add a particular content item to the generated video content and web content, that particular content item can be added to the content data 600 (e.g., by adding a row to the XML file).

However, while adding or removing content items to and from the content data 600 might be sufficient for modifying the generated web content, adding or removing content items to and from the content data 600 can have undesirable consequences for the character generator 308. In particular, making such additions or removals could cause the character generator 308 to restart generation of the ticker starting with content item A. This may be problematic if the content data 600 is altered (e.g., by adding or removing a content item) while the generated ticker presents some intermediate content item between content items A and J. For example, if the character generator 308 generates a ticker that sequentially presents content items A through J, and a content item is added to or removed from the content data 600 while the ticker presents content item D, the character generator 308 will restart generation of the video content such that the ticker restarts the sequential presentation with content item A before content items E through J have been presented.

In order to modify which content items are included or excluded from the generated media content without adding or removing content items from the content data 600, the content data 600 can include a set of active/inactive status attributes, as further shown in FIG. 6. Each of the content items corresponds with a respective active/inactive status attribute, and various media-generation systems, such as the character generator 308 and the web server 206, can be configured to include or exclude a content item from generated media content based on the respective active/inactive status attribute of each content item. For example, the character generator 308 can generate video content that includes content items corresponding to an "active" status attribute and excludes content items corresponding to an "inactive" status attribute. Similarly, the web server 206 can concurrently generate web content that includes content items corresponding to an "active" status attribute and excludes content items corresponding to an "inactive" status attribute. As shown, the character generator 308 and the web server 206 can concurrently generate media content that includes content items A, B, C, E, G, and H and excludes content items D, F, I, and J.

Figure 7A:
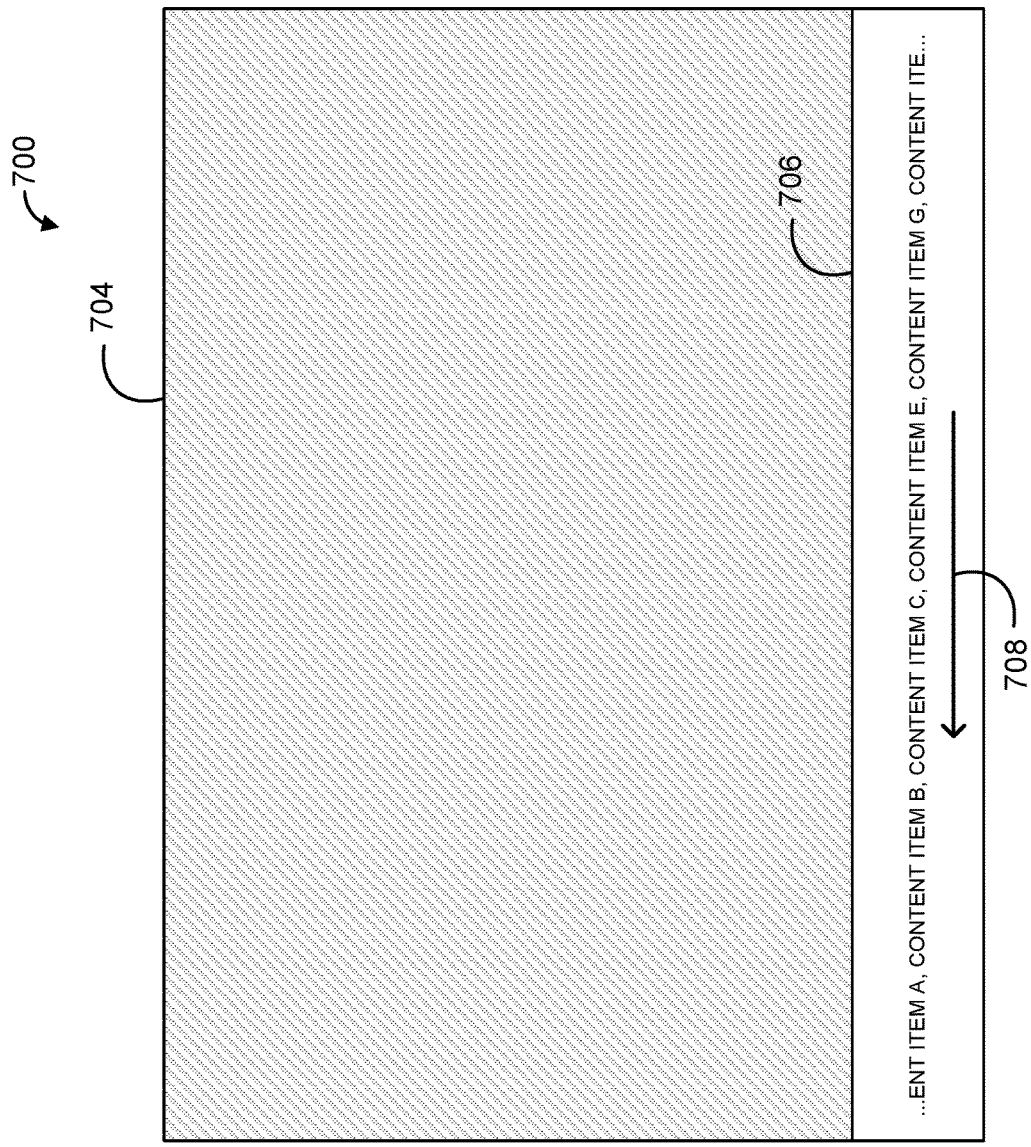
FIG. 7A is a simplified diagram of an example frame of video content, including content items of the example content data that correspond to active identifiers.
Figure 7B:
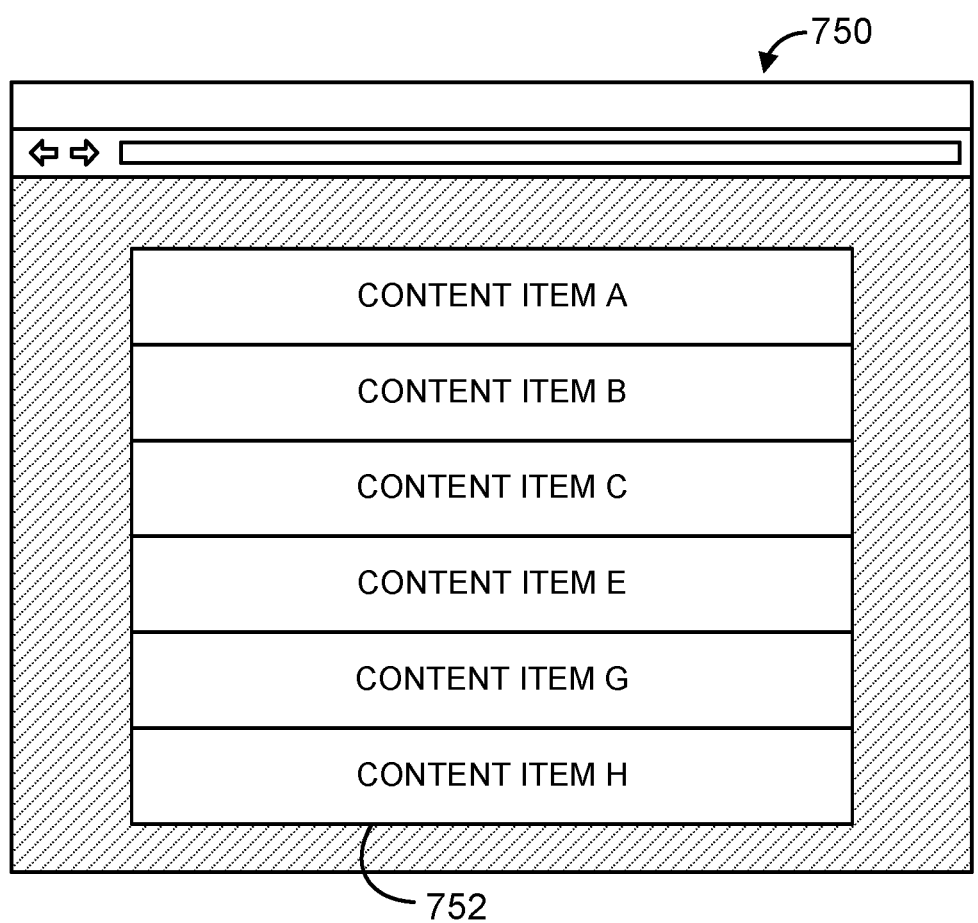
FIG. 7B is a simplified diagram of an example web page, including content items of the example content data that correspond to active identifiers.

FIGS. 7A and 7B help illustrate this concept of concurrently generating different media items based on the content data 600. FIG. 7A is a simplified depiction of an example frame 700 of video content generated by the character generator 308 and associated DVE systems. Frame 700 includes first content 704 with generated video content 706 overlaid on the first content 704, where the generated video content 706 includes only content items corresponding to an "active" status attribute—namely, content items A, B, C, E, G, and H. As shown, the generated video content 706 is depicted as a scrolling ticker overlaid on a bottom portion of the first content 704, but the generated video content 706 can take other forms, sizes, and positions as well, such as a full screen table graphic, for instance. FIG. 7B is a simplified depiction of an example web page 750 generated by the web server 206 as might be viewed through a user interface of the end-user device 208. Web page 750 includes web content 752, where the web content 752 also includes only content items corresponding to an "active" status attribute—namely, content items A, B, C, E, G, and H. As shown, the web content 752 displays the content items in an ordered table, but the web content 752 can display the content items in other forms as well.

In this manner, a particular content item can be concurrently added to or removed from multiple different media items by modifying the status attribute corresponding to the particular content item. For example, changing the status attribute of content item A from "active" to "inactive" would cause the character generator 308 to exclude content item A from the generated video content and would cause the web server 206 to exclude content item A from the generated web content. Similarly, changing the status attribute of content item D from "inactive" to "active" would cause the character generator 308 to include content item D in the generated video content and would cause the web server 206 to include content item D in the generated web content.

Further, because the modification of a particular content item's status attribute does not involve adding or removing a content item from the content data 600, such a modification would not cause the character generator 308 to restart the generated video content at the beginning of the sequential order of content items.

Figure 8:
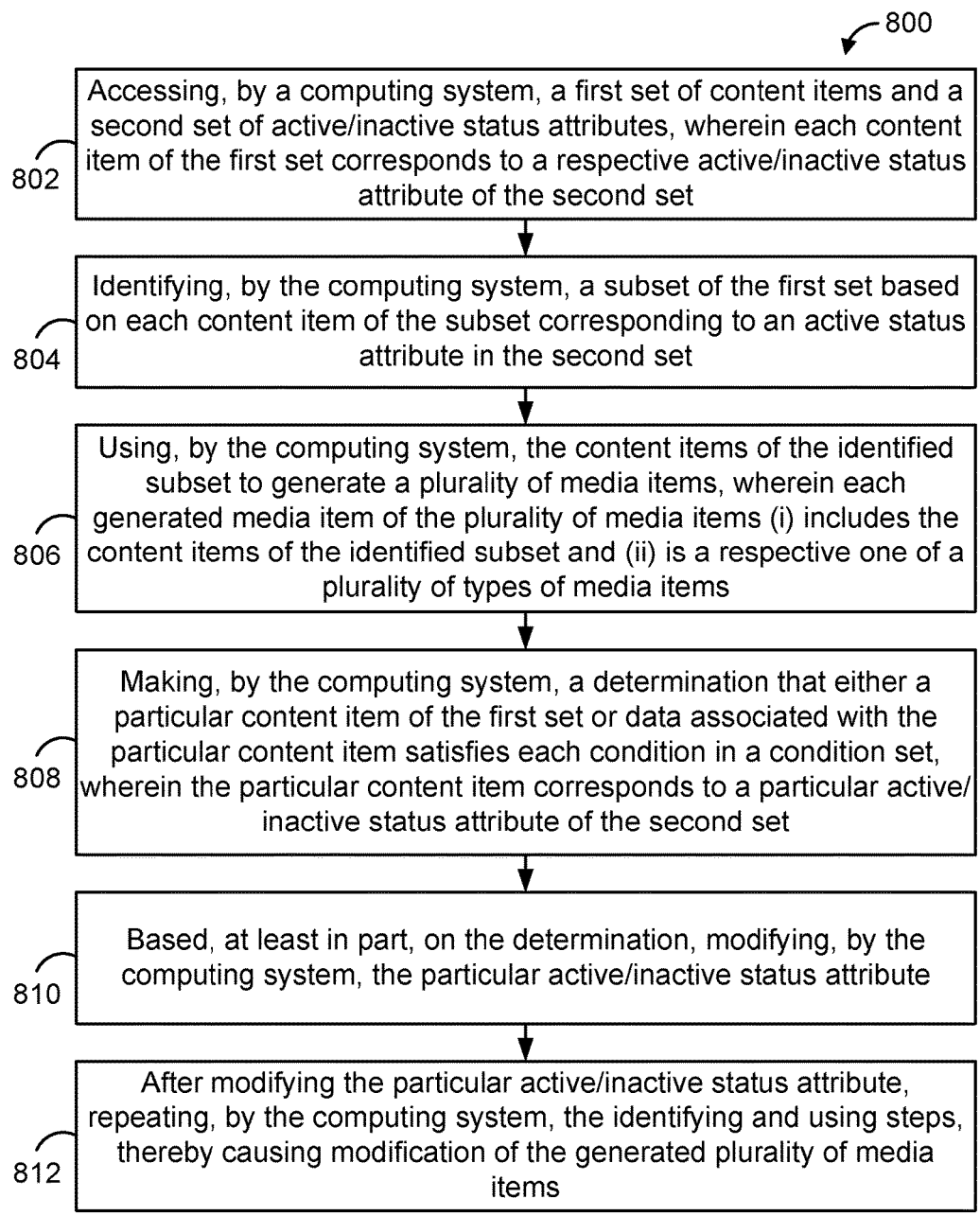
FIG. 8 is a flow chart of an example method.

FIG. 8 is a flow chart illustrating an example method 800. At block 802, the method 800 can include accessing, by a computing system, a first set of ordered content items and a second set of active/inactive status attributes, wherein each content item of the first set corresponds to a respective active/inactive status attribute of the second set.

Each content item of the first set can include respective data associated with an election. For instance, as noted above, the election system 306 can receive, select, and/or retrieve election data, such as a title of a political office that is the subject of the election, a name and other information of a candidate, an amount of votes cast and/or tabulated for a candidate, an amount and an identification of precincts or other zones reporting tabulated votes, and/or a projection outcome. The election system 306 can store the election data and/or associated data in a data storage unit as the first set of content items, and each content item of the first set can be associated with a respective active/inactive status attribute. As discussed above with respect to FIG. 6, these content items and status attributes can be stored in various forms, such as in the form of an XML file.

The content items and their corresponding active/inactive status attributes can also be transmitted to the character generator 308 and to the web server 206. The character generator template can specify that the character generator 308 is to receive the content items and their status attributes from the election system 306 or that the character generator 308 is to retrieve the content items and their status attributes from a data storage unit of the election system 306. Similarly, the web server 206 can be configured to receive the content items and their status attributes from the election system 306 or to retrieve the content items and their status attributes from a data storage unit of the election system 306.

At block 804, the method 800 can include identifying, by the computing system, a subset of the first set based on each content item of the subset corresponding to an active status attribute in the second set. Any or all of the election system 306, the character generator 308, and the web server 206, for instance, can determine for each content item of the first set, whether its corresponding active/inactive status attribute of the second set is indicative of an active status.

At block 806, the method 800 can include using, by the computing system, the content items of the identified subset to generate a plurality of media items, wherein each generated media item of the plurality of media items (i) includes the content items of the identified subset and (ii) is a respective one of a plurality of types of media items. As such, each generated media item of the generated plurality of media items can include content items associated with a respective active status attribute and exclude content items associated with a respective inactive status attribute. The plurality of types of media items can include, for instance, video content, such as video content that presents the content items of the identified subset in a scrolling, rotating, full screen, or other overlay fashion. The plurality of types of media items can further include web content, such as a web page that presents the content items of the identified subset in various graphical manners. Other examples of types of media items are possible as well.

In line with the discussion above, the character generator 308 can use the content items of the identified subset (i.e., content items associated with an active status attribute) to generate video content that includes the content items, such as in the form of a ticker that presents the content items in their specified order. As such, the generated video content can present the content items of the identified subset in a scrolling or rotating fashion. For example, where the content items include data associated with an election, the generated video content can include a ticker that presents a scrolling or rotating display of various candidate names and their respective vote counts or vote count percentages. Other examples are possible as well.

At block 808, the method 800 can include making, by the computing system, a determination that either a particular content item of the first set or data associated with the particular content item satisfies each condition in a condition set, wherein the particular content item corresponds to a particular active/inactive status attribute of the second set. And at block 810, the method 800 can include based, at least in part, on the determination, modifying, by the computing system, the particular active/inactive status attribute.

This modifying of the active/inactive status attribute can be advantageous in examples where the content items of the first set include data associated with an election, as it can be desirable to dynamically control whether certain election data is included in the generated video content as an election progresses. For instance, it can be desirable to include or exclude certain election data from the generated video content based on a current total vote count for a particular candidate or issue, an expected outcome of an election, voter turnout, viewer interest in a particular candidate or issue, and/or whether a candidate has dropped out of the election, among other factors.

Accordingly, in a first example, the condition set can include a first condition that less than a threshold amount of votes cast in connection with a vote count have been tabulated. In some instances, if this condition is satisfied, this may indicate that an insignificant number of votes have been tabulated.

In a second example, the condition set can include a second condition that a difference between an amount of votes tabulated for a first candidate of the election and an amount of votes tabulated for a second candidate of the election is at least a threshold amount. In some instances, if this condition is satisfied, this may indicate that the election is significantly lopsided.

In a third example, the condition set can include a third condition that a first projected outcome of the election and a second projected outcome of the election differ by at least a threshold extent, wherein the first projected outcome of the election is determined before the second projected outcome of the election is determined. In some instances, if this condition is satisfied, this may indicate that an earlier projection of the outcome of the election was significantly inaccurate.

In a fourth example, the condition set can include a fourth condition that a candidate associated with the particular content item is no longer associated with a race of the election. In some instances, if this condition is satisfied, this may indicate that a candidate has dropped out of the election.

In a fifth example, the condition set can include a fifth condition that voter turnout associated with the vote count is less than a threshold amount. In one example, election system 306 can determine a voter turnout amount by comparing an amount of voters registered in a given geographic area (e.g., covering one or more precincts associated with the election) with a corresponding amount of votes tabulated. In some instances, if this condition is satisfied, this may indicate that the election has significantly low voter turnout.

In a sixth example, the condition set can include a sixth condition that the vote count is associated with a particular race of the election. In some instances, if this condition is satisfied, this may indicate that a particular content item is associated with a particular election race, such as a presidential, congressional, or gubernatorial race, to name a few.

In a seventh example, the condition set can include a seventh condition that the vote count is associated with a particular candidate of the election. In some instances, if this condition is satisfied, this may indicate that a particular content item is associated with a particular candidate.

In an eighth example, the condition set can include an eighth condition that the vote count is associated with a particular location. In some instances, if this condition is satisfied, this may indicate that a particular content item is associated with a particular location, such as a state, county, or precinct, to name a few. Other examples are possible as well.

Based at least in part on the determination, while the video content is being generated by the character generator 308, the election system 306 can modify the particular active/inactive status attribute of the particular content item. As such, the particular active/inactive status attribute can be modified in various circumstances. For example, the particular active/inactive status attribute can be modified from "active" to "inactive" (or from "inactive" to "active") if a vote count associated with the content item is significantly low, if the election associated with the content item is significantly lopsided, if a projection of the election associated with the content item is significantly inaccurate, if a candidate associated with the content item has dropped out of the election, or if the voter turnout of the race associated with the content item is significantly low. Further, the particular active/inactive status attribute can be modified if the content item is associated with a particular race, candidate, or location. Other examples are possible as well.

At block 812, the method 800 can include, after modifying the particular active/inactive status attribute, repeating, by the computing system, the identifying and using acts, thereby causing modification of the generated plurality of media items. As described above with respect to blocks 804 and 806, the character generator 308 can generate video content that includes content items associated with active status attributes and excludes content items associated with inactive status attributes. Similarly, the web server 206 and/or the election system 306 can generate web content that includes content items associated with active status attributes and excludes content items associated with inactive status attributes. As such, modifying the particular active/inactive status attribute of the particular content item can cause the particular content item to be concurrently included in or excluded from a plurality of different media items generated by the media system 200.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more example of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
accessing, by a computing system, a first set of content items and a second set of active/inactive status attributes, wherein each content item of the first set corresponds to a respective active/inactive status attribute of the second set, and wherein each content item of the first set comprises respective data associated with an election;
identifying, by the computing system, a subset of the first set based on each content item of the subset corresponding to an active status attribute in the second set;
using, by the computing system, the content items of the identified subset to generate a plurality of media items, wherein each generated media item of the plurality of media items (i) includes the content items of the identified subset and (ii) is a respective one of a plurality of types of media items;
making, by the computing system, a determination that either a particular content item of the first set or data associated with the particular content item satisfies each condition in a condition set, wherein the particular content item corresponds to a particular active/inactive status attribute of the second set, and wherein the condition set comprises at least one condition from the group consisting of:
a first condition that less than a threshold amount of votes cast in connection with a vote count have been tabulated,
a second condition that a difference between an amount of votes tabulated for a first candidate of the election and an amount of votes tabulated for a second candidate of the election is at least a threshold amount,
a third condition that a first projected outcome of the election and a second projected outcome of the election differ by at least a threshold extent, wherein the first projected outcome of the election is determined before the second projected outcome of the election is determined,
a fourth condition that a candidate associated with the particular content item is no longer associated with a race of the election,
a fifth condition that voter turnout associated with the vote count is less than a threshold amount,
a sixth condition that the vote count is associated with a particular race of the election,
a seventh condition that the vote count is associated with a particular candidate of the election, and
an eighth condition that the vote count is associated with a particular location;
based, at least in part, on the determination, modifying the particular active/inactive status attribute; and
after modifying the particular active/inactive status attribute, repeating, by the computing system, the identifying and using steps, thereby causing modification of the generated plurality of media items.

2. The method of claim 1, wherein the plurality of types of media items comprises a video stream representing video content, wherein one or more of the generated media items is a video stream representing video content, and wherein the video content presents the content items of the identified subset.

3. The method of claim 2, wherein the first set of content items is a first set of ordered content items, wherein a character generator uses the content items of the identified subset to generate the video stream representing video content, and wherein the video content presents the content items of the identified subset in a scrolling or rotating fashion as ordered in the first set.

4. The method of claim 2, wherein the video content presents the content items of the identified subset in a full screen fashion.

5. The method of claim 1, wherein the plurality of types of media items comprises a webpage, and wherein one or more of the generated media items is a webpage for presenting the content items of the identified subset.

6. The method of claim 1, wherein one or more of the generated media items is a first type of media item, and wherein one or more of the generated media items is a second type of media item different from the first type.

7. The method of claim 1, wherein modifying the particular active/inactive status attribute comprises changing the particular active/inactive status attribute from an inactive status attribute to an active status attribute, and wherein causing modification of the generated plurality of media items comprises including the particular content item in the generated plurality of media items.

8. The method of claim 1, wherein modifying the particular active/inactive status attribute comprises changing the particular active/inactive status attribute from an active status attribute to an inactive status attribute, and wherein causing modification of the generated plurality of media items comprises excluding the particular content item from the generated plurality of media items.

9. A non-transitory computer-readable medium having stored thereon, program instructions that when executed by a processor, cause performance of a set of acts comprising:
accessing, by a computing system, a first set of content items and a second set of active/inactive status attributes, wherein each content item of the first set corresponds to a respective active/inactive status attribute of the second set, and wherein each content item of the first set comprises respective data associated with an election;

identifying, by the computing system, a subset of the first set based on each content item of the subset corresponding to an active status attribute in the second set;

using, by the computing system, the content items of the identified subset to generate a plurality of media items, wherein each generated media item of the plurality of media items (i) includes the content items of the identified subset and (ii) is a respective one of a plurality of types of media items;

making, by the computing system, a determination that either a particular content item of the first set or data associated with the particular content item satisfies each condition in a condition set, wherein the particular content item corresponds to a particular active/inactive status attribute of the second set, and wherein the condition set comprises at least one condition from the group consisting of:
- a first condition that less than a threshold amount of votes cast in connection with a vote count have been tabulated,
- a second condition that a difference between an amount of votes tabulated for a first candidate of the election and an amount of votes tabulated for a second candidate of the election is at least a threshold amount,
- a third condition that a first projected outcome of the election and a second projected outcome of the election differ by at least a threshold extent, wherein the first projected outcome of the election is determined before the second projected outcome of the election is determined,
- a fourth condition that a candidate associated with the particular content item is no longer associated with a race of the election,
- a fifth condition that voter turnout associated with the vote count is less than a threshold amount,
- a sixth condition that the vote count is associated with a particular race of the election,
- a seventh condition that the vote count is associated with a particular candidate of the election, and
- an eighth condition that the vote count is associated with a particular location;

based, at least in part, on the determination, modifying the particular active/inactive status attribute; and after modifying the particular active/inactive status attribute, repeating, by the computing system, the identifying and using steps, thereby causing modification of the generated plurality of media items.

10. The computer-readable medium of claim 9, wherein the plurality of types of media items comprises a video stream representing video content, wherein one or more of the generated media items is a video stream representing video content, and wherein the video content presents the content items of the identified subset.

11. The computer-readable medium of claim 10, wherein the first set of content items is a first set of ordered content items, wherein a character generator uses the content items of the identified subset to generate the video stream representing video content, and wherein the video content presents the content items of the identified subset in a scrolling or rotating fashion as ordered in the first set.

12. The computer-readable medium of claim 9, wherein the plurality of types of media items comprises a webpage, and wherein one or more of the generated media items is a webpage for presenting the content items of the identified subset.

13. The computer-readable medium of claim 9, wherein modifying the particular active/inactive status attribute comprises changing the particular active/inactive status attribute from an inactive status attribute to an active status attribute, and wherein causing modification of the generated plurality of media items comprises including the particular content item in the generated plurality of media items.

14. The computer-readable medium of claim 9, wherein modifying the particular active/inactive status attribute comprises changing the particular active/inactive status attribute from an active status attribute to an inactive status attribute, and wherein causing modification of the generated plurality of media items comprises excluding the particular content item from the generated plurality of media items.

15. A computing system comprising:
one or more processors; and
a non-transitory computer-readable medium having stored thereon program instructions that, upon execution by the one or more processors, cause performance of a set of acts comprising:

accessing, by the computing system, a first set of content items and a second set of active/inactive status attributes, wherein each content item of the first set corresponds to a respective active/inactive status attribute of the second set, and wherein each content item of the first set comprises respective data associated with an election;

identifying, by the computing system, a subset of the first set based on each content item of the subset corresponding to an active status attribute in the second set;

using, by the computing system, the content items of the identified subset to generate a plurality of media items, wherein each generated media item of the plurality of media items (i) includes the content items of the identified subset and (ii) is a respective one of a plurality of types of media items;

making, by the computing system, a determination that either a particular content item of the first set or data associated with the particular content item satisfies each condition in a condition set, wherein the particular content item corresponds to a particular active/inactive status attribute of the second set, and wherein the condition set comprises at least one condition from the group consisting of:
- a first condition that less than a threshold amount of votes cast in connection with a vote count have been tabulated,
- a second condition that a difference between an amount of votes tabulated for a first candidate of the election and an amount of votes tabulated for a second candidate of the election is at least a threshold amount,
- a third condition that a first projected outcome of the election and a second projected outcome of the election differ by at least a threshold extent, wherein the first projected outcome of the election is determined before the second projected outcome of the election is determined,
- a fourth condition that a candidate associated with the particular content item is no longer associated with a race of the election,
- a fifth condition that voter turnout associated with the vote count is less than a threshold amount, a sixth condition that the vote count is associated with a particular race of the election, a seventh condition that the vote count is associated with a particular candidate of the election, and an eighth condition that the vote count is associated with a particular location;

based, at least in part, on the determination, modifying the particular active/inactive status attribute; and after modifying the particular active/inactive status attribute, repeating, by the computing system, the identifying and using steps, thereby causing modification of the generated plurality of media items.

16. The system of claim 15, wherein the plurality of types of media items comprises a video stream representing video content, wherein one or more of the generated media items is a video stream representing video content, and wherein the video content presents the content items of the identified subset.

17. The system of claim 16, wherein the first set of content items is a first set of ordered content items, wherein a character generator uses the content items of the identified subset to generate the video stream representing video content, and wherein the video content presents the content items of the identified subset in a scrolling or rotating fashion as ordered in the first set.

18. The system of claim 15, wherein the plurality of types of media items comprises a webpage, and wherein one or more of the generated media items is a webpage for presenting the content items of the identified subset.

19. The computing system of claim 15, wherein modifying the particular active/inactive status attribute comprises changing the particular active/inactive status attribute from an inactive status attribute to an active status attribute, and wherein causing modification of the generated plurality of media items comprises including the particular content item in the generated plurality of media items.

20. The computing system of claim 15, wherein modifying the particular active/inactive status attribute comprises changing the particular active/inactive status attribute from an active status attribute to an inactive status attribute, and wherein causing modification of the generated plurality of media items comprises excluding the particular content item from the generated plurality of media items.

* * * * *